A. WILLIMAN.
FLUSHING DEVICE.
APPLICATION FILED MAR. 20, 1912.

1,046,923.

Patented Dec. 10, 1912.

WITNESSES
George Bambay.
J. L. McAuliffe

INVENTOR
Anton Williman
BY Munn & Co
ATTORNEYS

UNITED STATES PATENT OFFICE.

ANTON WILLIMAN, OF HOUSTON HEIGHTS, TEXAS.

FLUSHING DEVICE.

1,046,923.   Specification of Letters Patent.   Patented Dec. 10, 1912.

Application filed March 20, 1912. Serial No. 685,089.

*To all whom it may concern:*

Be it known that I, ANTON WILLIMAN, a citizen of the United States, and a resident of Houston Heights, in the county of Harris and State of Texas, have invented a new and Improved Flushing Device, of which the following is a full, clear, and exact description.

The invention relates to a flushing device that will operate to flush a closet, or other apparatus, without a separate water tank, and obviate the attendant disadvantages of a water tank.

My device comprises a casing to be interposed in the water pipe, said casing containing a shaft provided with a valve commanding the water passage in the pipe, and with a water wheel or equivalent device for rotating the shaft by the pressure of the flowing water. In connection with the shaft, there is a starting device provided for shifting the shaft axially to open the valve, and there is a latch device controlling the shaft to hold the valve in the open position. The latch is adapted to be automatically thrown out of engagement with the shaft by a revolving device, which may be termed a time trip, said trip comprising a worm wheel actuated by a worm on the valve shaft, and having a stud, or the like, to lift the latch and permit the valve to close when the shaft has made the given number of turns under the influence of the water wheel of the device.

The distinguishing features of the invention and the important elements in the illustrated structural embodiment of the invention will be more particularly explained in the specific description hereinafter to be given.

Reference is to be had to the accompanying drawings forming a part of this specification, in which similar characters of reference indicate corresponding parts in all the views.

Figure 1:
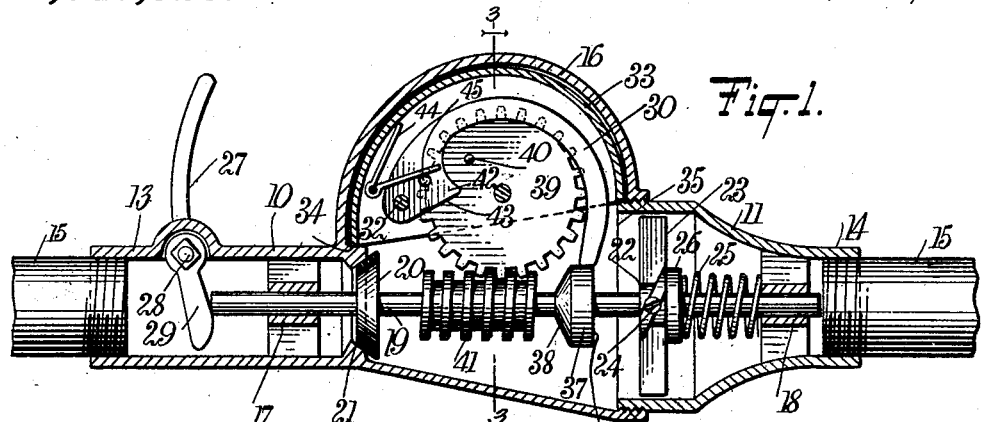
Figure 2:
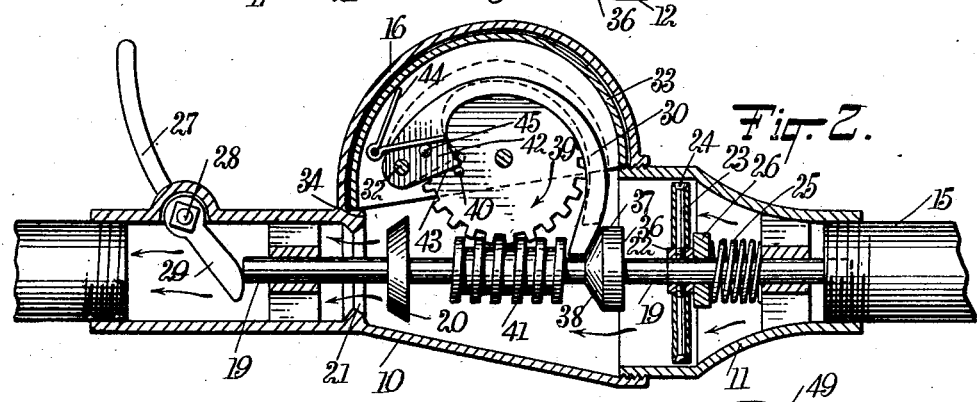
Figure 4:
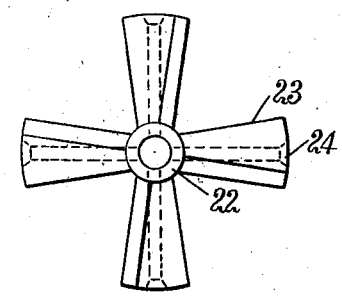
Figure 3:
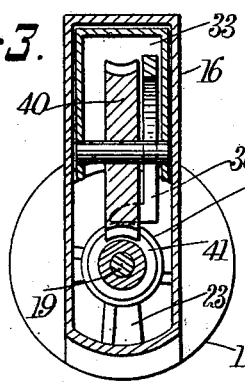
Figure 5:
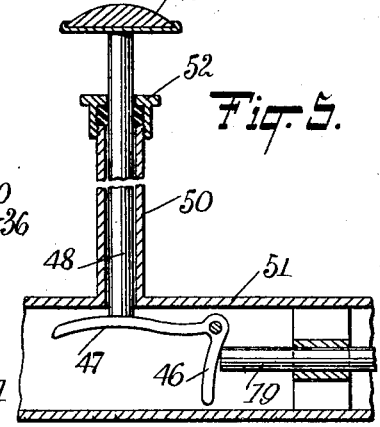

Figure 1 is a side elevation, with parts in section, showing my improved device in connection with a water service pipe, the valve being shown in the closed position; Fig. 2 is a similar view, with the parts in the position they occupy when the valve is open; Fig. 3 is a cross section taken on the line 3—3 in Fig. 1; Fig. 4 is a face view of one form of water wheel which may be employed in connection with my device; and Fig. 5 represents a slightly different form of the starting device which acts to open the valve, starting the flow of water.

In constructing a flushing device in accordance with the particular example illustrated as one embodiment of my invention, a casing is provided comprising the separable members 10, 11, which are coupled together by any suitable means, as for instance by a threaded connection as at 12. The members 10 and 11 terminate respectively in tubular ends 13, 14, adapted to be coupled in any suitable manner with sections 15 of the service pipe, so that the said casing is interposed at the proper point in the service pipe leading to the apparatus to be flushed. The casing has an enlargement as at 16, to accommodate and house certain of the operative elements of my device.

Mounted in bearings 17, 18 in the casing is a shaft 19 which constitutes the stem of a valve 20 adapted to command the outlet from the casing by seating on a valve seat 21. Adjacent to the inlet end of the casing the valve 20 is provided with suitable means for rotating it by the pressure of the flowing water, and said means is of a character to vary the amount of water passing therethrough, and therefore to vary the extent of turning movement that will be imparted to the shaft between the opening and closing of the valve.

In the illustrated example, I have shown for the purpose of illustration a water wheel 22 having blades 23 made adjustable as to their angularity, by any suitable means, there being shown adjusting screws 24 for the purpose. A compression spring 25 acting against a collar 26, or arranged in any other equivalent manner, normally tends to give the shaft a movement in the direction of the outlet to seat the valve 20 on its seat 21, and to move the shaft axially in the reverse direction against the action of the spring 25. A starting device is provided which, in the form illustrated in Figs. 1 and 2, consists of a starting lever 27 on a shaft 28 that extends through suitable stuffing boxes in the outlet terminal 13 of the casing, said shaft carrying within the casing, and preferably adjacent to said outlet end, an arm 29 which lies adjacent to the end of the shaft 19. A movement of the lever 27 will rock the shaft 28 and its arm 29, and thereby move the shaft 19 axially and open the valve 20 to start the flow of water through the casing. In connection with the shaft 19, I provide a latch for holding the said shaft in the position with the valve open, said latch being advantageously in the form of a rocking curved member 30, pivoted as at 32. Desirably the latch 30, and a trip and other appurtenances co-acting therewith, are mounted in a housing or removable inner casing 33 constituting a frame for the mentioned parts. The latch and the parts immediately relating thereto may be assembled in connection with the auxiliary housing and all placed in position, the said auxiliary housing being in the form of a narrow dome open at the bottom side, the dome being adapted to rest at one end on a shoulder 34 and at the opposite end said housing may rest on the inwardly projecting end 35 of the member 11 of the casing, as clearly shown in Figs. 1 and 2. The latch 30 may be a gravity latch, or spring-acted; it is of a curved form and its free end normally rests on a member 36 carried by the shaft 19, said member being desirably of a form to present a cylindrical perimeter 37 and a beveled face 38, the arrangement being such that the free end of the latch 30 normally rests on the perimeter 37, as in Fig. 1. When, however, the shaft 19 is moved axially to move the valve 20 away from the seat, the latch will drop so that its free end lies adjacent to the beveled face 38 of the shaft member, as shown in Fig. 2. To control the latch, a tripping means is provided, controlled by the rotation of the shaft, and hence is a time trip, functioning to raise the latch at the end of a predetermined period to govern the amount of water passing through the casing before the closing of the valve; to the mentioned end, the trip is desirably a worm wheel 39 mounted to rotate in the frame or housing 33, and carrying a stud 40, or its equivalent, said worm wheel meshing with a worm 41 on the shaft 19. The latch 30 is formed with a projection 42 presenting a cam surface 43 with which the stud 40 engages in the rotation of the worm wheel 39. Any suitable spring 44 may press on the latch 30 as against a stud 45, for instance.

With the described construction it will be observed that upon throwing the starting lever 27, the valve stem will be moved axially, and with it the remainder of the shaft 19, the valve 20 leaving its seat and moving to the position shown in Fig. 2, whereupon the latch 30 will drop behind the shaft member 36 and hold the valve open; the water passing through the water wheel 22, or equivalent device actuated by the pressure of the flowing water, will rotate the shaft 19 and with it the worm 41, which in turn will rotate the worm wheel 39 in the direction of the arrow in Fig. 2, until finally the trip stud 40 engages the projection 42 to finally leave the surface 43, or as it is termed in mechanics, to finally "cam off" from said surface. The contact of the trip stud 40 will have raised the latch out of line with the member 36 and permitted the shaft and valve to move axially under the action of the spring 25, and thereby close the valve.

In Fig. 5, a slightly different form of starting device is illustrated, in which the tripping lever 46 is in general of bell crank form, and has an arm 47 on which rests the lower end of a vertical pin or rod 48 having a head 49; said pin 48 being surrounded by a short standpipe 50 that rises from the outlet pipe 51, said standpipe being desirably provided with a stuffing box 52. Obviously, downward pressure on the head of the pin 48 will rock the starting valve and move the valve stem 19. The form shown in Fig. 5 has the advantage that there will be possibly less danger of leakage than in the form previously described, in which the shaft of the starting lever extends through the outlet pipe at a point adjacent to the water passage.

It will be understood that in practice, before the member 11 of the casing is placed in position, the removable frame 33 carrying the latch and tripping wheel is inserted in the main body of the casing in proper position, and subsequently the shaft and its immediate appurtenances are placed in position, after which the member 11 of the casing is coupled. The construction also makes the operative parts readily accessible for repair.

Having thus described my invention, I claim as new and desire to secure by Letters Patent:

1. A flushing apparatus comprising a casing forming a water passage, a valve commanding the passage, a shaft forming the stem of the valve, means for moving the valve stem, a device operated by the pressure of the flowing water to rotate the shaft, a member on said shaft having a beveled face and a cylindrical perimeter, a latch device mounted to rock toward and from the shaft, its end being movable into engagement with the shaft member on its said beveled face, and a latch-tripping device actuated by the rotation of the shaft.

2. A flushing apparatus, comprising a casing forming a water passage, a shaft mounted for revoluble and axial movement in the casing, said shaft carrying a water wheel, a valve movable with the shaft and controlling the water passage, a starting device having engagement with the shaft to move the valve from its seat, a rocking latch within the casing, and disposed lengthwise of the shaft and at one side thereof, a member on the shaft adjacent to the free end of the latch and adapted to be engaged by the said latch to hold the valve from the seat, and a revolving trip to release the latch, said trip having driven connection with the shaft.

3. A flushing apparatus, comprising a casing forming a water passage, a valve commanding the said passage and having coupling ends to engage adjacent pipe sections, means for opening the valve, a shaft carrying the valve, and movable axially, and means for holding and releasing the valve, said means comprising a member on the shaft and co-acting members in the casing, said co-acting members being mounted on a frame housed within the casing and removable from the casing through one of the coupling ends thereof.

4. A flushing apparatus, comprising a casing forming a water passage, a shaft mounted to rotate and to move axially in the casing, a valve commanding the said passage and movable axially with the shaft, and co-acting latching and releasing devices on the shaft and within the casing respectively, said co-acting devices comprising a worm on the shaft, a worm wheel in mesh with the worm, and located within the casing a latch within the casing for holding the shaft with the valve in the open position, and means on the worm wheel for tripping the latch.

5. A flushing apparatus, comprising a casing forming a water passage, a shaft mounted for revoluble and axial movement in the casing and carrying a valve commanding said passage, a device on the shaft within the casing and operable by the pressure of the flowing water for rotating the shaft, a pivoted, spring-pressed latch ranging lengthwise of the shaft at one side thereof within the casing, a member rotating with the shaft and with which the free end of the latch may engage, and a revoluble trip rotating within the casing parallel with the latch and adjacent thereto, said trip being driven by the shaft and having a lateral member movable into tripping engagement with the latch.

6. A flushing apparatus comprising a casing forming a water passage, a shaft mounted for revoluble and axial movement in the casing and carrying a valve commanding said passage, a device on the shaft within the casing and operable by the pressure of the flowing water for rotating the shaft, an auxiliary housing within the casing at one side of the shaft and removable from the casing, a pivoted latch mounted in the auxiliary housing, a device revolving with the shaft and adapted to be engaged by the latch, and a revoluble trip also carried by the auxiliary housing and having a laterally projecting member adapted to engage the latch, said revoluble trip being driven from the said shaft.

In testimony whereof I have signed my name to this specification in the presence of two subscribing witnesses.

ANTON WILLIMAN.

Witnesses:
NEWTON C. ABBOTT,
GLEA D. LINDLEY.

Copies of this patent may be obtained for five cents each, by addressing the "Commissioner of Patents, Washington, D. C."